(12) United States Patent
Jeong et al.

(10) Patent No.: US 11,025,855 B2
(45) Date of Patent: Jun. 1, 2021

(54) CONTROLLING A DISPLAY APPARATUS USING A VIRTUAL UI PROVIDED BY AN ELECTRONIC APPARATUS

(71) Applicant: SAMSUNG ELECTRONICS CO., LTD., Suwon-si (KR)

(72) Inventors: Da-hee Jeong, Seoul (KR); Se-hyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/119,615

(22) Filed: Aug. 31, 2018

(65) Prior Publication Data

US 2019/0075266 A1    Mar. 7, 2019

(30) Foreign Application Priority Data

Sep. 4, 2017    (KR) .................. 10-2017-0112777

(51) Int. Cl.
*H04N 5/445* (2011.01)
*G06F 3/01* (2006.01)
(Continued)

(52) U.S. Cl.
CPC ............. *H04N 5/445* (2013.01); *G06F 3/011* (2013.01); *G06F 3/013* (2013.01); *G06F 3/017* (2013.01); *G06F 3/0346* (2013.01); *G06T 7/73* (2017.01); *G06T 19/006* (2013.01); *H04N 5/44504* (2013.01); *H04N 21/41265* (2020.08);
(Continued)

(58) Field of Classification Search
CPC ............. H04N 21/47; H04N 21/41265; H04N 21/42204; H04N 21/42228; H04N 21/42208; H04N 21/42222; H04N 5/44504; H04N 21/816; H04N 21/482; H04N 21/4438; G06F 3/013; G06F 3/0346; G06F 3/011; G06F 3/017; G06T 7/73; G06T 19/006
See application file for complete search history.

(56) References Cited

U.S. PATENT DOCUMENTS 8,482,527 B1    7/2013  Kim
2008/0266323 A1    10/2008  Biocca et al.
(Continued)

FOREIGN PATENT DOCUMENTS

EP    3 009 915 A1    4/2016
WO    2013082009 A1    6/2013
(Continued)

OTHER PUBLICATIONS

International Search Report and Written Opinion (PCT/ISA/210 and PCT/ISA/237), dated Feb. 26, 2019 issued by International Searching Authority in International Application No. PCT/KR2018/010070.
(Continued)

*Primary Examiner* — John W Miller
*Assistant Examiner* — Humam M Satti
(74) *Attorney, Agent, or Firm* — Sughrue Mion, PLLC

(57) ABSTRACT

An electronic apparatus for providing an augmented reality display including a virtual user interface corresponding to a user interface displayed on a display apparatus, and to receive input via the virtual user interface for controlling the display apparatus.

20 Claims, 13 Drawing Sheets

(51) Int. Cl.
　　　*G06F 3/0346*　　(2013.01)
　　　*H04N 21/422*　　(2011.01)
　　　*H04N 21/41*　　(2011.01)
　　　*H04N 21/47*　　(2011.01)
　　　*G06T 7/73*　　(2017.01)
　　　*G06T 19/00*　　(2011.01)

(52) U.S. Cl.
　　　CPC . *H04N 21/42204* (2013.01); *H04N 21/42208* (2013.01); *H04N 21/42222* (2013.01); *H04N 21/42228* (2013.01); *H04N 21/47* (2013.01)

(56) References Cited

U.S. PATENT DOCUMENTS

| | | |
|---|---|---|
| 2013/0187835 A1 | 7/2013 | Vaught et al. |
| 2013/0246967 A1* | 9/2013 | Wheeler ............ G02B 27/0093 715/784 |
| 2014/0267074 A1 | 9/2014 | Balci et al. |
| 2016/0005174 A1* | 1/2016 | Ellsworth ................ G06T 7/73 382/103 |
| 2016/0054791 A1 | 2/2016 | Mullins et al. |
| 2016/0147492 A1* | 5/2016 | Fugate ................... G09G 3/001 345/633 |
| 2016/0182940 A1 | 6/2016 | Assayag et al. |
| 2017/0076502 A1* | 3/2017 | Chen ..................... G06F 1/1626 |
| 2017/0115742 A1 | 4/2017 | Xing et al. |
| 2018/0367835 A1* | 12/2018 | Hamidi-Rad ...... H04N 21/4126 |
| 2019/0146219 A1* | 5/2019 | Rodriguez, II ........ G06F 3/0482 345/633 |
| 2019/0340816 A1* | 11/2019 | Rogers ................... H04L 67/22 |

FOREIGN PATENT DOCUMENTS

| | | |
|---|---|---|
| WO | 2014042458 A1 | 3/2014 |
| WO | 2014 /147686 A1 | 9/2014 |
| WO | 2016164178 A1 | 10/2016 |

OTHER PUBLICATIONS

Communication dated Feb. 14, 2020 issued by the European Patent Office in counterpart European Application No. 18851893.0.
Communication dated Jun. 22, 2020, issued by the European Patent Office in European Application No. 18851893.0.

* cited by examiner

CONTROLLING A DISPLAY APPARATUS USING A VIRTUAL UI PROVIDED BY AN ELECTRONIC APPARATUS

CROSS-REFERENCE TO RELATED APPLICATION

This application is based on and claims priority under 35 U.S.C. § 119 to Korean Patent Application No. 10-2017-0112777, filed on Sep. 4, 2017, in the Korean Intellectual Property Office, the disclosure of which is incorporated herein by reference in its entirety.

BACKGROUND

1. Field

Embodiments of the present disclosure relate to an electronic apparatus, a control method thereof and a computer program product using the same and more particularly to an electronic apparatus that displays a user interface (UI) related to a display apparatus, a control method thereof and a computer program product using the same.

2. Description of Related Art

A display apparatus, such as a television (TV), operates according to a user's input received through a user interface (UI). The UI may be an input device, such as a remote controller or the like. In general, for user input through the UI, a direction key provided on the remote controller or a motion input using a sensor, such as a gyroscope, may be used.

Accordingly, there is a problem when motion input is used, in the case that a utilization range of user's input is restricted, if a travel distance of motion is short, the motion may not be recognized, thereby making the motion recognition difficult to precisely apply. Also, since types, kinds, and numbers of the UI provided through the TV screen are limited, there is a demand for various user input models.

Recently, an electronic apparatus, i.e., a mixed reality (MR) device, which provides the user with a so-called mixed reality (MR) or augmented reality (AR) environment in which a virtual object is merged into a real world, is becoming more popular. The MR device provides a user with a view of the physical environment enhanced by a hologram object or a virtual image, and may receive a user's input, such a motion or a voice recognition to interact with the mixed reality or augmented reality environment.

SUMMARY

Embodiments address at least the above problem and/or other disadvantages and disadvantages not described above.

The embodiments may provide an electronic apparatus, which enables a user's input to a display apparatus using an electronic apparatus for providing a mixed reality (MR), a control method thereof, and a computer program product using the same.

Further, the embodiments may provide an electronic apparatus, which provides a user interface (UI) related to a display apparatus in various types via a MR environment, a control method thereof, and a computer program product using the same.

Furthermore, the embodiments may provide an electronic apparatus, which enables a user's remote and precise selection to a UI displayed on a screen, a control method thereof, and a computer program product using the same.

Also, the embodiments may provide an electronic apparatus, which can enlarge a screen area to provide various UIs related to a display apparatus for a user, a control method thereof, and a computer program product using the same.

According to an aspect of an embodiment, there is provided an electronic apparatus including: a camera configured to capture an image; a communicator configured to communicate with a display apparatus; a display; a processor configured to: receive location information from the display apparatus; control the display to display a virtual UI on a location of the image corresponding to the location information; and control the communicator to transmit information corresponding to user input to the virtual UI to the display apparatus. Accordingly, it is possible to remotely control the display apparatus using a MR device which displays an image in which the captured image and the virtual UI are mixed.

The processor may be configured to identify a screen area of the display apparatus from the image, and control the display to display the virtual UI on a given location to the screen area in the image. Thus, the virtual UI is displayed based on locations of the TV screen area, so the user input locations for the virtual UI may be exactly detected.

The processor may be configured to control the display to locate the virtual UI on at least one of a top, a bottom, up, a left, or a right of the screen area. Thus, the screen area may be enlarged to provide a user with various virtual UIs related to the display apparatus.

The processor may be configured to control the display, so that the virtual UI is located to correspond to a menu displayed on a screen of the display apparatus in the screen area. Thus, the user may freely select the virtual UI like selecting a UI displayed on the TV screen.

The processor may be configured to control the display to display the virtual UI on a preset location in a user's view area provided by the display. Thus, frequently used menus may always be displayed regardless of changes in the user's view area, thereby helping user's convenience.

The processor may be configured to identify a location of the electronic apparatus relative to the display apparatus based on information from the image, and identify the screen area to correspond to the location. Thus, the virtual UI may be naturally displayed with the TV screen, thereby increasing user's sensation of immersion.

The processor may be configured to receive coordinate information of the virtual UI from the display apparatus through the communicator, and display the virtual UI to correspond to the coordinate information in a user's view area provided by the display. Thus, data received from the display apparatus may be used to display the virtual UI at a proper location.

The processor may be configured to control the communicator to, in response to a user's gesture selecting an element of the virtual UI, transmit a control command corresponding to the element as the user input information to the display apparatus. Thus, proper operation corresponding to the user's gesture may be carried out in the display apparatus.

The virtual UI may correspond to at least one of a menu for controlling the display apparatus, a content capable of being reproduced in the display apparatus, or an application capable of being executed in the display apparatus. Thus, various virtual UI selectable by the user may be provided, thereby more improving user's convenience.

The processor may be configured to perform a connection with the display apparatus thorough the communicator based on information from the image. Thus, even users not used to establish communication may easily connect and use the TV and the MR device.

According to an aspect of another embodiment, there is provided a control method of an electronic apparatus including: capturing an image with a camera; receiving location information from a display apparatus; displaying an image with which a virtual UI is displayed on a location of the image corresponding to the location information; and in response to a user input corresponding to the virtual UI, transmitting information corresponding to the user input information to the display apparatus. Accordingly, it is possible to remotely control the display apparatus using a MR device which display an image in which the captured image and the virtual UI are mixed.

The method may further include identifying a screen area of the display apparatus from the image, and displaying the virtual UI on a given location to the screen area in the image. Thus, the virtual UI is displayed based on locations of the TV screen area, so the user input locations for the virtual UI may be exactly detected.

The displaying the virtual UI may include locating the virtual UI on at least one of a top, a bottom, up, a left, or a right of the screen area. Thus, the screen area may be enlarged to provide a user with various virtual UIs related to the display apparatus.

The displaying the virtual UI may include locating the virtual UI to correspond to a menu displayed on a screen of the display apparatus in the screen area. Thus, the user may freely select the virtual UI like selecting a UI displayed on the TV screen.

The displaying the virtual UI may include displaying the virtual UI on a preset location in a user's view area provided by a display of the electronic apparatus. Thus, frequently used menus may always be displayed regardless of changes in the user's view area, thereby helping user's convenience.

The identifying the screen area may include identifying a location of the electronic apparatus relative to the display apparatus based on information from the image, and identify the screen area to correspond to the location. Thus, the virtual UI may be naturally displayed with the TV screen, thereby increasing user's sensation of immersion.

The receiving the UI information may include receiving coordinate information of the virtual UI from the display apparatus, and the displaying the image with which the virtual UI is mixed may include displaying the virtual UI to correspond to the coordinate information in a user's view area provided by a display of the electronic apparatus. Thus, data received from the display apparatus may be used to display the virtual UI at a proper location.

The method may further include receiving a user's gesture selecting an element of the virtual UI, and in response to the user's gesture, transmitting a control command corresponding to the element as the user input information to the display apparatus. Thus, proper operation corresponding to the user's gesture may be carried out in the display apparatus.

The method may further include performing a connection with the display apparatus thorough a communicator based on information from the image captured by the camera. Thus, even users not used to establish communication may easily connect and use the TV and the MR device.

According to an aspect of other embodiment, there is provided a non-transitory computer readable medium having stored thereon computer executable instructions for executing a method of controlling an electronic apparatus, the method including receiving location information from a display apparatus, displaying an image with which a virtual UI is displayed on a location of an image corresponding to the location information, the image being captured by a camera, and in response to a user input corresponding to the virtual UI, transmitting information corresponding to the user input information to the display apparatus. Accordingly, it is possible to remotely control the display apparatus using a MR device which display an image in which the captured image and the virtual UI are mixed.

According to the embodiments as described above, the electronic apparatus, the control method thereof and the computer program product using the same may display the image in which the image captured by the camera and the virtual UI are mixed and transmit a signal according to the user input for the displayed virtual UI to the display apparatus, thereby remotely controlling the display apparatus using the MR device which provides the MR.

Further, the electronic apparatus, the control method thereof and the computer program product using the same may receive the location information of the virtual UI from the display apparatus and locate the virtual UI based on the screen area of the display apparatus, thereby exactly detecting the user input location to provide widened utilization range for user inputs.

Also, the electronic apparatus, the control method thereof and the computer program product using the same do not restrict types, kinds, numbers and display locations of the virtual UI which is displayed in the MR environment, thereby providing expanded user input function.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION OF THE EMBODIMENTS

Figure 1:
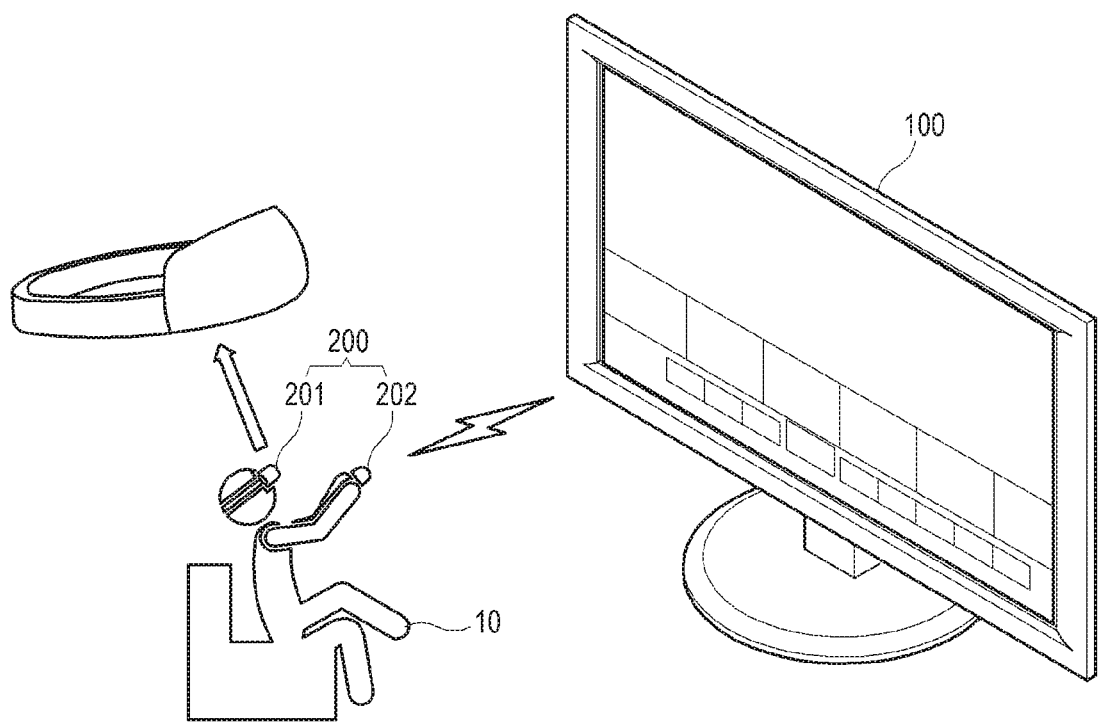
FIG. 1 is a diagram illustrating a system including an electronic apparatus and a display apparatus according to an embodiment.

Hereinafter, embodiments will be described in detail with reference to accompanying drawings. Elements illustrated in the accompanying drawings are referred to in the following descriptions of the embodiments and for clarity, like reference numerals or symbols presented in respective drawings denote like elements, which substantially perform the same functions.

FIG. 1 is a diagram illustrating a system including an electronic apparatus and a display apparatus according to an embodiment.

In an embodiment, the display apparatus 100, may be controlled by the electronic apparatus 200, is operated according to a command of a user 10 received from a remote input device. The remote input device may include the electronic apparatus 200, for example, a remote controller or an input part, such as an operation panel, which is provided on the electronic apparatus itself. As illustrated in FIG. 1, the display apparatus 100 may display a user interface (UI) (hereinafter, also referred to a 'graphical user interface (GUI)') selectable by the user.

The display apparatus 100 processes an image signal provided from an external image providing source according a preset image processing process to display an image corresponding thereto.

In an embodiment, as illustrated FIG. 1, the display apparatus 100 may be implemented as a television (TV), which processes a broadcast image based on broadcast signal, broadcast information, and/or broadcast data received from a transmission equipment of a broadcasting station. The broadcast signal received in the display apparatus 100 may be also received via terrestrial television, satellite, cable and so on. In the disclosure, a source providing an image signal is not limited to the broadcasting station. In other words, any apparatus or station may be included in the image providing source.

Further, the display apparatus 100 may receive an image signal from various types of external apparatuses. Also, the display apparatus 100 may process signals to display on the screen one or more of: motion images, still images, applications, on-screen displays (OSDs), user interfaces (UIs) for various operations, etc., which are based on signals/data stored in internal/external storing media.

In an embodiment, the display apparatus 100 may be implemented as a smart TV or an internet protocol (IP) TV. The smart TV is a TV that receives a broadcast signal in real time and may provide a web browsing function, thereby displaying the broadcast signal in real time. The display apparatus 100 may also perform at the same time searching for and consuming various contents via Internet, and which may provide convenient user environment. Also, the smart TV include an open software platform, which may provide a bi-directional service for the user. Accordingly, the smart TV may provide the user 10 with many contents, for example, applications for providing given services, via the open software platform. The applications are application programs, which may provide various kinds of services, and includes, for example, applications that provide services, such as social network service (SNS), finance, news, weather information, map information, music, movies, games, electronic books, etc.

However, the disclosure is not limited to the display apparatus 100 according to the embodiments described above. The display apparatus 100 may also be apparatuses that process the image, for example, a monitor connected to a main computer and the like.

The electronic apparatus 200 has an image capture or pickup function for an actual real-world environment including the screen of the display apparatus 100.

In an embodiment, the electronic apparatus 200 mixes and renders the captured actual real-world environment and a virtual environment, such as one or more virtual UI, to provide a so-called MR or AR environment for the user 10. The electronic apparatus 200 (hereinafter, also referred to a 'MR device') is provided to display a mixed image generated based on the actual environment and virtual elements superimposed onto or into the actual environment to the user 10 and to receive a user's input for via virtual UI for interaction in the displayed MR.

The actual environment (physical environment) means a real world, i.e., a real space. In other words, various objects, which constitute the real space, are included in the actual environment.

The virtual environment provides one or more visual elements, such as a three dimensional (3D) holographic object, a two dimensional (2D) virtual image and so on, which are various types of virtual objects.

In an embodiment, the virtual objects are generated and displayed based on locations of the real space. In another embodiment, the virtual objects are generated and displayed on given locations within range of a view of the user 10. In the disclosure, the virtual UI may be implemented in a form of 3D holographic object or 2D virtual image.

In the disclosure, although the virtual UI has been specified as an example of a virtual image formed on the display of the electronic apparatus 200, an expression "a virtual image" or "a hologram" may be also used instead of the virtual UI. The virtual image includes a virtual object, such a UI, a still image or the like, which is not a genuine article, such as a content or the like.

The electronic apparatus 200 displays a mixed image, which includes real objects and generated virtual objects, to allow the user to view the augmented reality. The real objects may include various electronic devices, furniture, walls and so on, as well as the display apparatus 100.

In an embodiment, as illustrated in FIG. 1, the electronic apparatus 200 may be a head mounted display (HMD) device (201) or other wearable device. The HMD device 201 includes, as an example, a glasses or goggle type wearable device including a transparent display. The HMD device 201 may be implemented in various forms in which a transparent or semitransparent display panel is disposed in front of eyes of the user 10, i.e., the viewer.

In an embodiment, the HMD device 201 may be implemented as an ocular type display apparatus, which is located close to the eyes of the user 10. The ocular type display apparatus may include two displays corresponding to both eyes of the user. The two displays may display the same screen or different screens.

The HMD device 201 may display an image according to a movement of the user 10. The user 10 may move her or his whole body or only her or his head. In this case, the HMD device 201 displays an image corresponding to an actual environment, which is dynamically displayed according to the movement and direction of the user 10.

In an embodiment, the HMD device 201 may be configured to visually increase an appearance of the actual environment being viewed by the user 10. For example, an appearance of the actual environment provided through the transparent display to generate the MR environment may be provided in such a form increased in color and brightness to increase a user's visibility, as compared to a captured original image.

The HMD device 201 is provided to receive a gesture, i.e., a motion input and an audio input (i.e., a voice input) from the user 10. In other words, the user 10 may make a gesture for selecting an element of a virtual UI using her or his body, for example, a finger, with the HMD device being worn, and information or the element selected by the gesture may be transmitted to the display apparatus 100 to allow the display apparatus 100 to perform an operation corresponding thereto.

In another embodiment, the electronic apparatus 200 may be a mobile device 202, such as a portable phone, a smart phone, a smart pad, etc.

The mobile device 202 displays a mixed image including a virtual UI via a display. The user selects elements of the virtual UI by a gesture, i.e., a touch input on a touch screen, and a command corresponding to information of the element selected by the gesture is transmitted to display apparatus 100.

Although FIG. 1 illustrates that the user 10 interacts with the display apparatus 100 using both the HMD device 201 and the mobile device 202, that is merely an example, and the disclosure may be implemented, so that the user remotely controls the display apparatus 100 using only one electronic apparatus 200. In other words, the electronic apparatus 200 will be operable as a remote control device replacing a remote controller for a TV, which is an implemented form of the display apparatus 100.

Hereinafter, a detailed configuration of the display apparatus 100 and the electronic apparatus 200 will be described with reference to the drawings.

Figure 2:
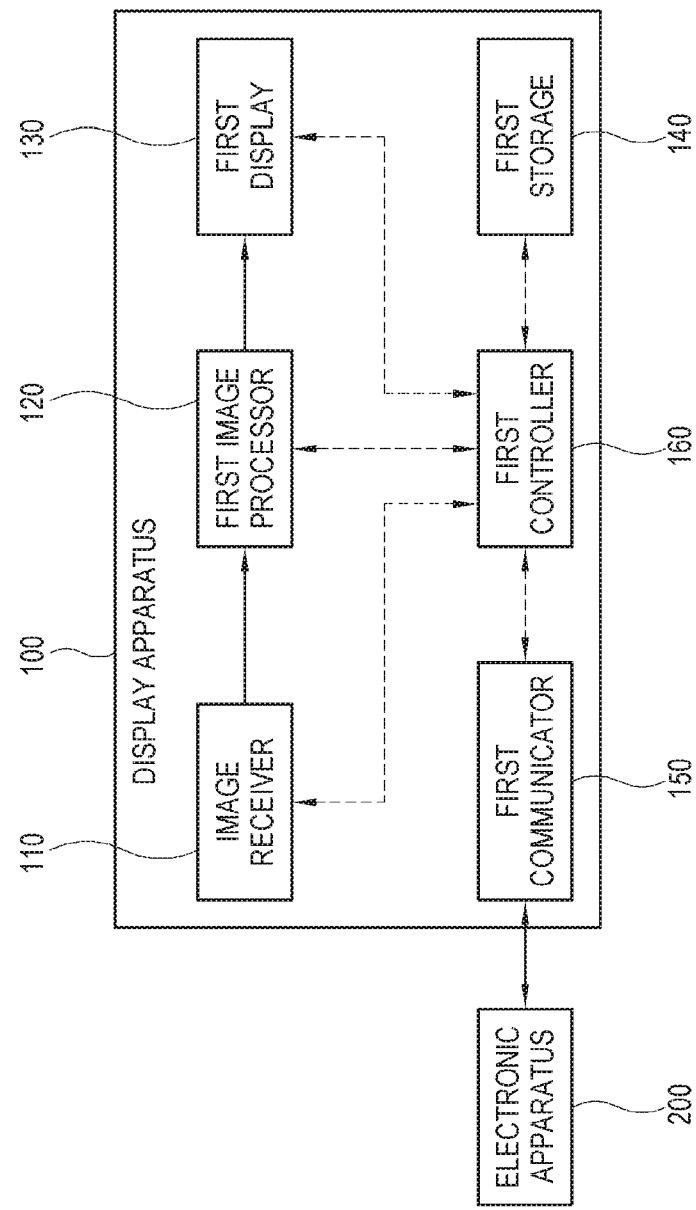
FIG. 2 is a block diagram illustrating a display apparatus according to an embodiment.

FIG. 2 is a block diagram illustrating a display apparatus 100 according to an embodiment.

As illustrated in FIG. 2, the display apparatus 100 includes an image receiver 110, a first image processor 120, a first display 130, a first storage 140, a first communicator 150 and a first controller 160.

The image receiver 110 receives an image signal (content) from an external apparatus, which is provided to the first image processor 120. The image signal may be formatted according to one or more standards and may be configured in various ways according to implemented types of the display apparatus 100. For example, the image receiver 110 may receive a radio frequency (RF) signal wirelessly transmitted from a broadcasting station, or an image signal according to standards, such as composite video, component video, super video, SCRAT, high definition multimedia interface (HDMI), etc. by wire.

In an embodiment, if the image signal is a broadcasting signal, the signal receiver 110 may include a tuner for tuning the broadcasting signal according a selected channel.

Further, the image signal may be received from eternal apparatuses, such as, for example, a mobile device including a smart phone, a smart pad, such as a tablet, and a MP3 player, a personal computer (PC) including a desktop or a laptop, etc. Furthermore, the image signal may come from data received via network, such as the Internet, and in this case, the display apparatus 100 may receive an image signal through a first communicator 150.

Also, the image signal may be received from data stored in the first storage 140, which may be a nonvolatile memory, such as a flash memory, a hard disk and the like. The first storage 140 may be internal to or external from the display apparatus 100. If the first storage 140 is provided external from the display apparatus 100, the display apparatus 100 may further include a connector to which the first storage 140 is connected.

The first image processor 120 performs various video/audio processing processes with respect to the image signal received from the signal receiver 110. The first image processor 120 outputs an output signal generated or combined from performing the video processing processes to the first display 130 to display an image corresponding to the image signal on the first display 130.

The first image processor 120 may include a decoder, which decodes the image signal to correspond to an image format of the display apparatus 100, and a scaler, which adjusts the image signal to meet an output standard of the first display 130. The decoder may be implemented as, for example, a moving picture experts group (MPEG) decoder. Here, video processing processes performed by the first image processor 120 may further perform at least one of various processes, such as de-interlacing for converting an interlace type broadcast signal into a progressive type image signal, noise reduction for enhancing image quality, detail enhancement, frame refresh rate conversion, line scanning, etc.

The first image processor 120 may be implemented as a group of individual elements that can perform the above-described processes, or in a form contained in a main system-on-chip (SoC) in which various functions are incorporated. The main SoC may include at least one microprocessor or central processing unit (CPU), which is an example of implementing the first controller 160.

In an embodiment, the first image processor 120 may be implemented as an image board in which circuit configurations including various chipsets, memories, electronic parts, and wirings for performing the above-described processes, respectively, are mounted on a printed circuit board (PCB). In this case, the display apparatus 100 may be configured, so that the image receiver 110, the first image processor 120 and the first controller 160 are provided on a signal image board. Of course, this is merely an example, and the image receiver 110, the first image processor 120 and the first controller 160 may be also disposed on a plurality of PCBs, which is connected to communicate with one another.

The image signal processed by the first image processor 120 is output to the first display 130. The first display 130 displays an image corresponding to the image signal received from the first image processor 120.

Implemented types of the first display 130 are not limited. For example, the first display 130 may be implemented in various display ways, such as liquid crystal display (LCD), plasma, light-emitting diode (LED), organic light emitting diodes (OLED), surface-conduction electron-emitter, carbon nano-tube, nano-crystal, etc. The first display 130 may further include additional configuration (for example, a driver) according to its implemented type.

The first display 130 displays at least one UI selectable by the user thereon. In an embodiment, the UI displayed on the first display 130 may correspond to a virtual UI, which is displayed by the electronic apparatus 200.

In an embodiment, the first display 130 displays a pattern on a given location of a screen. The electronic apparatus 200 identifies distance and direction information between the display apparatus 100 and the electronic apparatus 200 based on data obtained from capturing the pattern displayed on the first display 130. The identified distance and direction information is used to generate a MR display at the electronic apparatus 200.

The first storage 140 is configured to store various data of the display apparatus 100. The first storage 140 may be provided with a non-volatile memory (writable ROM), which retains data regardless whether the display apparatus 100 is turned on or off and which is writable to reflect changes. In other words, the first storage 140 may be provided with any one of a flash memory, an EPROM or an EEPROM. The first storage 140 may be further provided with a volatile memory, such as a DRAM or a SRAM, which has a reading or writing speed faster than the non-volatile memory.

Data stored in the first storage 140 includes, for example, an operating system (OS) for driving the display apparatus 100, and various applications, image data, additional data and so on.

To be more specific, the first storage 140 may store signals or data which are input or output to correspond to respective operations of elements according to control of the first controller 160. The first storage 140 may store programs for controlling the display apparatus 100, UIs related to applications provided by a manufacturer or downloaded from the external, images for providing the UIs, user information, documents, databases, or related data.

In an embodiment, the first storage 140 may further storage identification information (for example, MAC address), which can directly communicate with the electronic apparatus 200 via the first communicator 150.

In the descriptions of the embodiments, the term 'storage' is defined as including a ROM or a RAM in the first storage 140 and the first controller 160, or a memory card (for example, a micro card, a memory stick or the like) mountable on the display apparatus 100.

The first communicator 150 communicates with various external apparatuses including the electronic apparatus 200 using a wired or wireless communication method. The first communicator 150 includes a wired and/or wireless communication module.

In an embodiment, the first communicator 150 includes at least one of short distance communication modules, such as Bluetooth, Bluetooth low energy, infrared data association (IrDA), wireless fidelity (Wi-Fi) direct, Zigbee, ultra-wide band (UWB), and near field communication (NFC). The short distance communication modules may be provided to support direct communication between the display apparatus 100 and the electronic apparatus 200 by wireless communication with or without an access point (AP).

In an embodiment, the first communicator 150 further includes a wireless local area network (LAN) unit. The wireless LAN unit may be connected with the electronic apparatus 200 via the AP according to control of the first controller 160. The wireless LAN unit may include a Wi-Fi communication module.

In an embodiment, the first communicator 150 may include a wired communication module, such as Ethernet.

The first communicator 150 according to an embodiment may be composed of one or more than two combinations of a short distance communication modules, a wireless LAN unit, and Ethernet.

The first controller 160 performs control needed for operating all the elements of the display apparatus 100. The first controller 160 may execute a control program (or instructions) to perform the control operations, and may include a non-volatile memory in which the control program is installed, a volatile memory in which at least a portion of the control program is loaded, and at least one processor or CPU which executes the loaded control program.

The processor may include a single core, a dual core, a triple core, a quad core and a multiple core thereof. The processor may include a plurality of processors, for example, a main processor and a sub-processor to operate in a sleep mode, for example, if the display apparatus is supplied only with a standby power and not operated. Also, the processor, the ROM and the RAM may be interconnected via an internal bus.

In an embodiment, the first controller 160 or the first image processor 120 may further include a graphic processing unit (GPU) for graphic processing.

Also, in another embodiment, if the display apparatus 100 is implemented as a digital TV, the processor may include a GPU. For example, the processor may be implemented in a form of SoC in which a core and a GPU are combined together.

The processor, which is an example of implementing the first controller 160 according to an embodiment, may be implemented in a form contained in a main SoC mounted on a printed circuit board (PCB) built in the display apparatus 100. In another embodiment, the main SoC may further include a first image processor 120, which processes an image signal.

The control program may include a program (or programs), which is implemented in the form of at least one of a BIOS, a device driver, an OS, a firmware, a platform, or an application program (application). As an embodiment, the application program may be installed or stored in advance in the display apparatus 100 in manufacturing, or installed in the display apparatus 100 based data for the application received from an external in use. The data for the application programs may be downloaded to the display apparatus 100 from an external server, such as, for example, an application server or the like.

In an embodiment, the first controller 160 performs communication with the electronic apparatus 200 via the first communicator 150. The first controller 160 controls the first communicator 150 to transmit information about a UI displayed on the first display 130 and/or a virtual UI displayed on the display of the electronic apparatus 200 to the electronic apparatus 200. Also, the first controller 160 receives user selection information for the virtual UI from the electronic apparatus 200 through the first communicator 150 and performs operation corresponding to the received user selection information.

In an embodiment, the operations of the first controller 160 as described above may be also implemented as a computer program, which is stored in a computer program product separately provided from the display apparatus 100.

In this case, the computer program product includes a medium in which instructions corresponding to the computer program are stored, and executed by a processor. The instructions, which are executed by the processor, include transmitting information related to the virtual UI to the electronic apparatus 200 and performing an operation corresponding to a user's selection received via the electronic apparatus 200.

Accordingly, the display apparatus 100 may download and execute the computer program stored in the separate computer program product to perform the operations.

Figure 3:
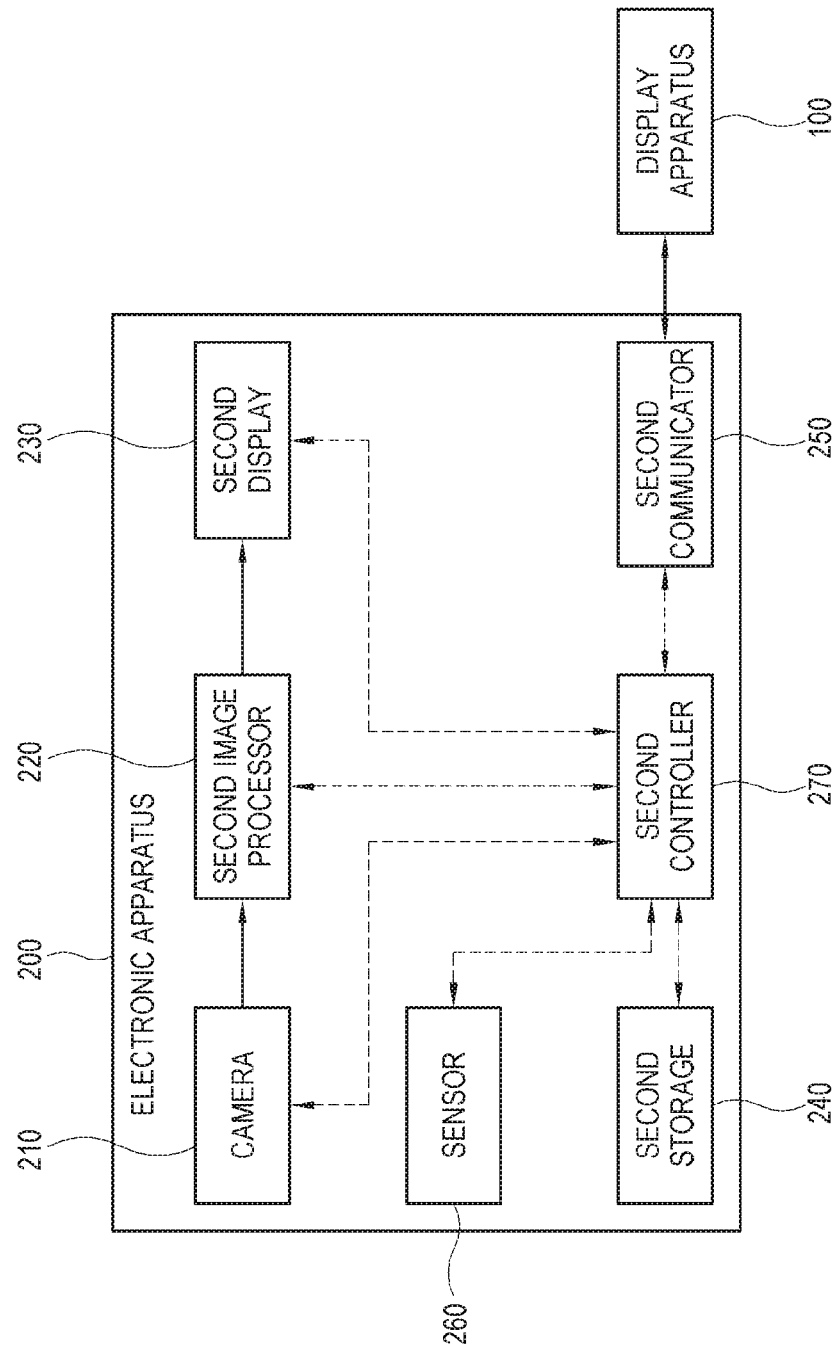
FIG. 3 is a block diagram illustrating an electronic apparatus according to an embodiment.

FIG. 3 is a block diagram illustrating an electronic apparatus 200 according to an embodiment.

FIG. 3 illustrates a configuration of the electronic apparatus 200 implemented as a HMD device 201. As illustrated in FIG. 3, the electronic apparatus 200 includes a camera 210, a second image processor 220, a second display 230, a second storage 240, a second communicator 250 a sensor 260 and a second controller 270.

The camera 210 includes a lens through which a captured image passes and an image sensor. The camera 210 converts light input through the lens into an electronic image signal to output to the second controller 270. The user may capture a motion image or a still image through the camera 210.

The lens converges the input light to form an optical image of a subject. The image sensor detects the optical image formed by the external light input through the lens as an electronic image signal. As the image sensor, a chargecoupled device (CCD) image sensor, a complementary metal-oxide semiconductor (CMOS) image sensor and the like may be used.

In an embodiment, the camera 210 may be composed of a plurality of image capturing devices. The plurality of image capturing devices may be provided with two image capturing devices to respectively correspond to both eyes of the user, or more than two image capturing devices as occasion demands. The camera 210 may further include a video camera and/or a depth camera, which capture a motion image.

In an embodiment, the camera 210 obtains image data, which capture a front view of the user. The camera 210 may capture the front view in a view angle including an angle of field (field of view) through which the user views via through the screen of the second display 230. A wide-angle lens for securing an angle of field of 90~110° similar to that of a human body may be attached to the camera 210. The second controller 270 may obtain distance and direction information of the electronic apparatus 200 relative to a real-world object using image data obtained through two image capturing devices corresponding to both eyes of the user.

In an embodiment, the electronic apparatus 200 may be provided to sense a gesture of the user, i.e., a motion input, which is made in a field of view through the camera 210.

In an embodiment, the electronic apparatus 200 may be further provided with a microphone which receives a sound input (or voice input) of the user.

The second image processor 220 performs image processing to display an image of a MR corresponding to an actual image captured by the camera 210 on the second display 230.

In an embodiment, the second image processor 220 may process on a frame basis, a virtual UI or the like generated based on an image input from the camera 210, an image stored in the second storage 240, data stored in the second storage 240, or data received from the display apparatus 100 through the second communicator 260, thereby to perform an image processing to meet screen output characteristics (size, image quality, resolution, etc.).

The second display 230 displays an image based on the image processing of the second image processor 220. The image displayed on the second display 230 corresponds to a reality world captured by the camera 210 and a MR environment in which at least one virtual UI is mixed.

In an embodiment, the virtual UI may be displayed on a given location of the screen of the first display 130 of the display apparatus 100, which is a reality object, i.e., at least one location of a top, a bottom, a left or a right of the screen. Alternatively, the virtual UI may be displayed on a given location in a field of view of the user 10 who wears the electronic apparatus 200 or a given location fixed in a second display 230 area of the electronic apparatus 200.

The second display 230 may be implemented using transmissive projection technology, reflective technology, emissive technology and the like, by which a white light from a light source is demodulated. The technologies may be implemented using a LCD type display having strong backlight and high light energy density.

In an embodiment, the first display 130 includes a transparent display panel having a display area through which light is penetrable. For example, the first display 130 may be implemented as various structures of panels, for example, a panel in which a spontaneous light emitting structure using a transparent OLED is applied or a panel in which an image is displayed by external light without separate light emitting elements. Here, the first display 130 may include more than two transparent display panels corresponding to both eyes of the user.

In an embodiment, the second display 230 may include a projector which outputs projection light, a panel through which the projection light outputted from the projector passes, and a projection lens, which magnifies and projects the light passing through the panel onto a screen. Accordingly, the user has a direct view corresponding to an actual environment in front of the electronic apparatus 200, i.e., the HMD device 201. The user may recognize a real-world object with the HMD device 201 being worn, and at the same time, see a MR screen including a virtual UI via the transparent display panel. The MR screen formed through the second display 230 as described above is provided, so that a location of the virtual object is specified with a three dimensional (3D) coordinate in a space of user's field of view.

The second storage 240 is configured to store various data of the electronic apparatus 200. The second storage 240 may be provided with a non-volatile memory (writable ROM), which retains data regardless of whether the electronic apparatus 200 is turned on or off, and which is writable to reflect changes. In other words, the second storage 240 may be provided with any one of a flash memory, an EPROM or an EEPROM. The second storage 240 may be further provided with a volatile memory, such as a DRAM or a SRAM, which has a reading or writing speed faster than the non-volatile memory.

Data stored in the second storage 240 includes, for example, an OS for driving the electronic apparatus 200, and various applications, image data, additional data and so on.

To be more specific, the second storage 240 may store signals or data which are input or output to correspond to respective operations of elements according to control of the second controller 270. The second storage 240 may store programs for controlling the electronic apparatus 200, information on virtual UI provided by a manufacturer or received from an external source, such as the display apparatus 100, images for providing the UIs, user information, or related data.

In an embodiment, the second storage 240 may further store identification information (for example, MAC address), and can directly communicate with the display apparatus 100 via the second communicator 250. Also, the second storage 240 may further store coordinate information which can specify locations to the space of the user's view.

The second communicator 250 communicates with various external apparatus including the display apparatus 100 using a wired or wireless communication method. The second communicator 250 includes a wired and/or wireless communication module.

In an embodiment, the second communicator 250 includes at least one of short distance communication modules, such as Bluetooth, Bluetooth low energy, IrDA, Wi-Fi direct, Zigbee, UWB, and NFC. The short distance communication modules may be provided to support wireless communication between the display apparatus 100 and the electronic apparatus 200 with or without an AP.

In an embodiment, the second communicator 250 further includes a wireless LAN unit. The wireless LAN unit may be wirelessly connected with the display apparatus 100 by via the AP according to control of the second controller 270. The wireless LAN unit may include a Wi-Fi communication module.

In an embodiment, the second communicator 250 may include a wired communication module, such as Ethernet.

The second communicator 250 according to an embodiment may be composed of one or more than two combinations of a short distance communication modules, a wireless LAN unit, and Ethernet.

The sensor 260 may include all sorts of sensors, such as a motion sensor, a proximity sensor, a position sensor, an acoustic sensor and so on, which can sense external information. The motion sensor may sense movements, postures, oriented directions, tilted angles and the like of the electronic apparatus 200. In an embodiment, the motion sensor may have a direction sensor, such as a gyroscope, to sense a direction the user wearing the HMD device 201 is watching. Alternatively, the motion sensor may have an acceleration sensor to sense a direction or speed at which the user wearing the HMD device 201 moves.

In an embodiment, the sensor 260 may further include an eye tracking sensor, which tracks pupil responses, positions and/or movements of user's eyes. The second controller 270 may identify a direction the user is looking and also which physical object or virtual object the user is looking, based on information detected by the eye tracking sensor.

The second controller 270 performs controls needed for operating all the elements of the electronic apparatus 200. The second controller 270 may include a control program (or instructions), which controls to perform the control operations, a non-volatile memory in which the control program is installed, a volatile memory in which at least a portion of the control program is loaded, and at least one processor or CPU, which executes the loaded control program.

The processor may include a single core, a dual core, a triple core, a quad core and a multiple core thereof. The processor may include a plurality of processors, for example, a main processor and a sub-processor to operate in a sleep mode, for example, if the display apparatus is supplied only with a standby power and not operated. Also, the processor, the ROM and the RAM may be interconnected via an internal bus.

In an embodiment, the processor of the electronic apparatus 200 may include a GPU. For example, the processor may be implemented in a form of SoC in which a core and a GPU are combined together.

The control program may include a program (or programs), which is implemented in form of at least one of a BIOS, a device driver, an OS, a firmware, a platform, or an application program (application). As an embodiment, the application program may be installed or stored in advance in the electronic apparatus 200 in manufacturing, or installed in the electronic apparatus 200 based data for the application received from an external in use. The data for the application programs may be downloaded to the electronic apparatus 200 from an external server, such as, for example, an application server or the like.

If the second controller 270 is implemented as a single processor, for example, a CPU, the CPU may be provided to be executable, for example, controls about progresses of various image processing processes for generating the MR image displayed on the second display 230, controls about wired and wireless network communications with the display apparatus 100 through the second communicator 250, and the like.

In an embodiment, the electronic apparatus 200 performs communication with the display apparatus 100 via the second communicator 250. The second controller 270 controls the second communicator 250 to receive information about a virtual UI displayed on the second display 230 from the display apparatus 100. Also, the second controller 270 detects a user's input for the virtual UI through the camera 210, and transmits a control signal corresponding to the detected user's input to the display apparatus 100 to allow the display apparatus 10 to perform an operation corresponding thereto.

In an embodiment, the operations of the second controller 270 may be also implemented as a computer program, which is stored in a computer program product separately provided from the electronic apparatus 200.

In this case, the computer program product includes a memory in which instructions corresponding to the computer program are stored, and executed by a processor. The instructions, which are executed by the processor, include receiving information related to the virtual UI from the display apparatus 100, rendering a MR environment in which the virtual UI is reflected in a real world based on the received information to output to the second display 230, and transmitting a control signal corresponding to a user's selection to the displayed virtual UI to the display apparatus 100.

Accordingly, the electronic apparatus 200 may download and execute the computer program stored in the separate computer program product to perform the operations of the second controller 270.

On the other hand, according to another embodiment, the electronic apparatus 200 may be implemented as a mobile device 202, such as a smart phone, a smart pad (tablet), etc.

The electronic apparatus 200, which may be implemented as the mobile device 202, includes a camera 210, a second image processor 220, a second display 230, a second storage 240, a second communicator 250, a sensor 260 and a second controller 270, like the electronic apparatus 200 according to the embodiment implemented as the HMD device 201, as illustrated in FIG. 3. However, an implemented type of the second display 230 may be different as compared to those of the electronic apparatus 200 according to the embodiment implemented as the HMD device 201.

In the electronic apparatus 200 implemented as the mobile device 202, the implemented type of the second display 230 is not limited. For example, the second display 230 may be implemented in various display ways, such as liquid crystal, plasma, LED, OLED, surface-conduction electron-emitter, carbon nano-tube, nano-crystal, etc. Also, the second display 230 may include a touch screen, which displays a virtual UI and senses a touch input as a user's gesture to the virtual UI. The second controller 270 transmits user input information to the virtual UI displayed on the touch screen to the display apparatus 100 through the second communicator 250.

Thus, in the electronic apparatus according to another exemplary embodiment, elements, which perform the same operations as those of the electronic apparatus according to the previous embodiment, are represented by like names and numerals or symbols, and to avoid duplicate explanations, detailed descriptions thereon will be omitted.

Hereinafter, control operations performed in the display apparatus 100 and the electronic apparatus 200 according to an embodiment will be described with reference to the drawings.

Figure 4:
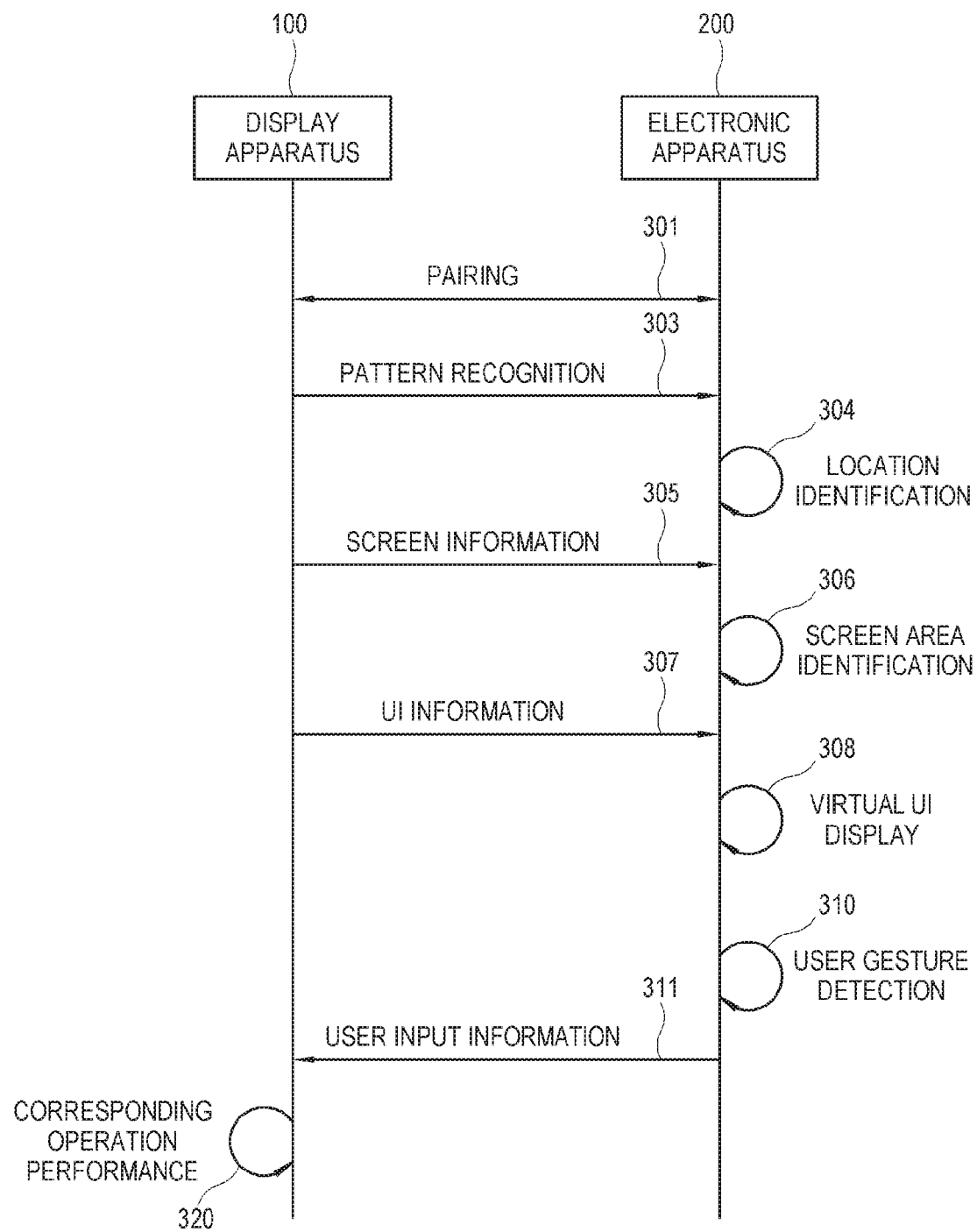
FIG. 4 is a flowchart illustrating a method of operation between the display apparatus and the electronic apparatus according to an embodiment.

FIG. 4 is a flowchart illustrating a method of operation between the display apparatus and the electronic apparatus according to an embodiment.

As illustrated in FIG. 4, the electronic apparatus 200, i.e., the MR device, which provides the user with the MR environment according to an embodiment, performs communication setting, i.e., pairing, for connecting with the display apparatus 100, which is an object constituting an actual environment in a space (301). Here, the display apparatus 100 and the electronic apparatus 200 may be connected by short range communications, such as Bluetooth, Wi-Fi direct and the like. The connected display apparatus 100 is operated as an object device to be controlled, which receives a control signal according to a user's input from the electronic apparatus 200.

To this end, the electronic apparatus 200 received identification information for pairing from the display apparatus 100.

In an embodiment, the electronic apparatus 200 may capture a pattern displayed on the screen of the first display 130 of the display apparatus 100 through the camera 210, and recognizes identification information, for example, an MAC address, for communication setting with the display apparatus 100 from the captured image. In this case, displaying the pattern on the display apparatus 100 may act as a trigger for the communication setting. The electronic apparatus 200 transmits its own identification information to the display apparatus 100 in response to receiving the identification information of the display apparatus 100, and thereby the pairing between the two apparatuses 100 and 200 is completed.

In another embodiment, the display apparatus 200 may perform the communication setting, i.e., pairing, with the display apparatus 100 in a different way, such as, for example, using simple service discovery protocol (SSDP) or the like, without using the captured pattern.

The electronic apparatus 200 captures the pattern displayed on the screen of the paired display apparatus 200 with the camera 210, and recognizes the captured pattern (303).

The second controller 270 may identify a relative location of the electronic apparatus 200 to the display apparatus 100 using a type, a location, a size and the like of the recognized pattern (304). Here, the relative location of the electronic apparatus 200 to the display apparatus 100 may include a distance between the two apparatuses 100 and 200, and a direction of the electronic apparatus 200 on the basis of the display apparatus 100, for example, a gaze direction of the user wearing the HMD device 201 and an angle thereof.

FIGS. 5 to 8 illustrate examples of the pattern displayed on the screen of the display apparatus according to embodiments.

As illustrated in FIGS. 5 to 8, the patterns 41, 42, 43, and 44 may be composed of a preset form, such as a quick response (QR) code. The patterns, which are implemented as the QR code, may include unique information of the display apparatus 100, such as a MAC address. Also, the patterns may include information, such as a model name and a screen size of the display apparatus 100.

In an embodiment, the patterns 41, 42, 43, and 44 may be provided in a form, which can distinguish the top, bottom, left and right thereof and recognize shape change by rotation or tilt.

Figure 5:
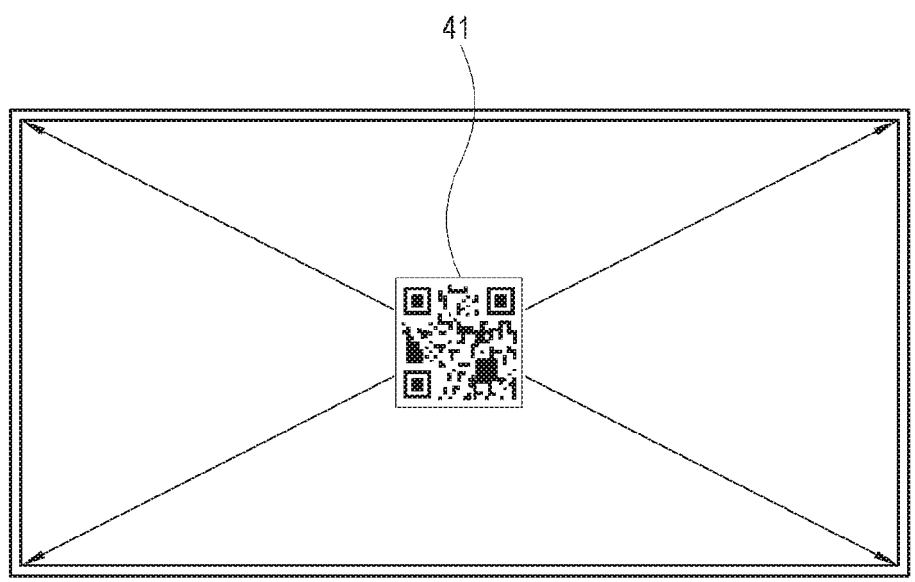
FIGS. 5, 6, 7, and 8 are diagrams illustrating examples of a pattern displayed on a screen of the display apparatus according to embodiments.
Figure 6:
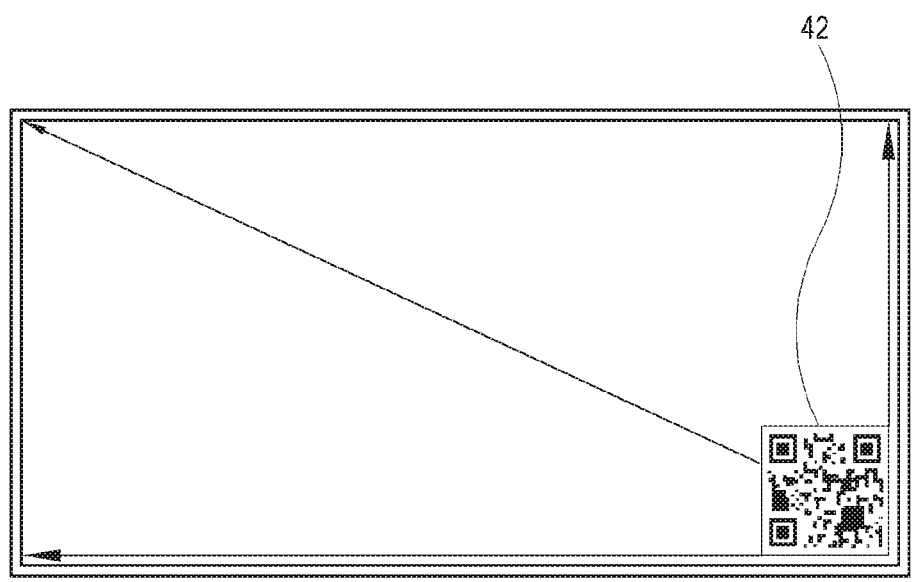

As illustrated in FIG. 5, the pattern 41 may be located in the middle of the screen of the first display 130. Also, as illustrated in FIG. 6, the pattern 42 may be located on a specific corner of the screen of the first display 130. Although in FIG. 6, the pattern 42 has been illustrated as being located, for example, on a bottom right corner of the screen of the first display 130, it will be also located in a different corner of the screen of the first display 130.

Figure 7:
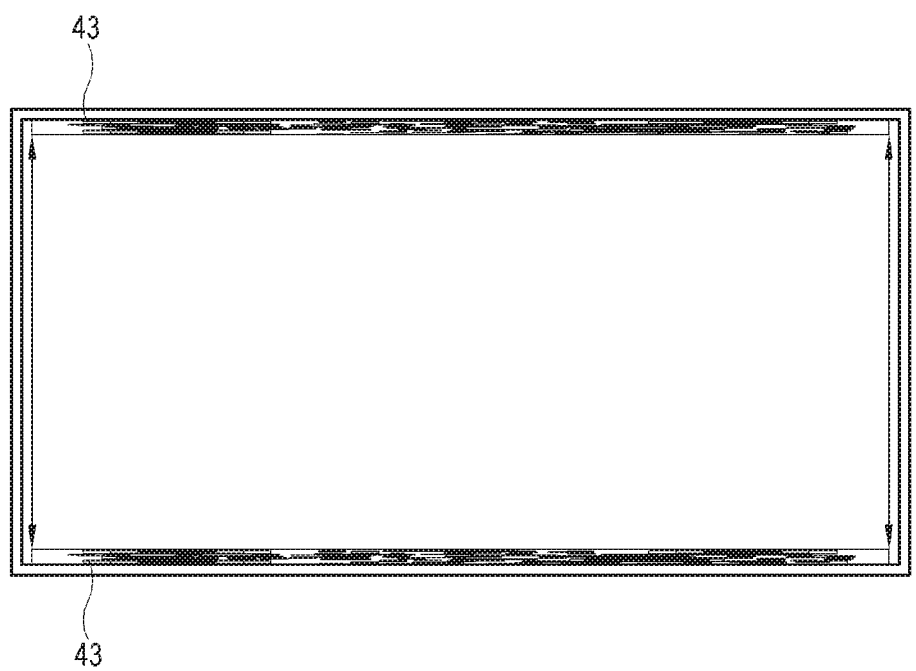
Figure 8:

The patterns 43 and 44 as illustrated in FIGS. 7 and 8 may be located on borders, i.e., edges of the screen of the first display 130. In other words, the first controller 160 controls the first display 130 to display the pattern 43 on top and bottom edges of the screen as in FIG. 7 or the pattern 44 on left and right edges of the screen as in FIG. 8.

FIGS. 5 to 8 illustrates examples of the pattern displayed on the display apparatus 100 according an embodiment, and the disclosure is not limited thereto. In other words, the patterns may be implemented in various other types that can be captured and recognized in the electronic apparatus 200, as well as the QR code. The number of displayed patterns is also not limited to one or two, and more than three patterns will be located in combination on various locations, for example, the middle and corners, or the middle and edges of the screen. If a plurality of patterns is displayed on various locations of the screen of the display apparatus 100, that may provide an improved accuracy in identifying a relative location, i.e., a distance and a direction, to the display apparatus 100 in the electronic apparatus 200.

In an embodiment, the second controller 270 grasps types, locations, and sizes of the captured patterns 41, 42, and 44, and compares grasped information with reference information stored in the second storage 240. In an embodiment, the second storage 240 may store reference information, for example, kinds and original sizes (measurements) of patterns, according to patterns 41, 42, 43 and 43 which are displayed on respective locations of the screen of the display apparatus 100. The reference information may be stored, so that a plurality of patterns is matched with display locations (middle, corners, top and bottom, left and right, etc.) of the screen of the display apparatus 100, respectively.

The second controller 270 may identify a relative location of the electronic apparatus 200 to the display apparatus 100 according to the comparison result.

To be more specific, the second controller 270 compares sizes of the captured patterns 41, 42, 43 and 44 with the reference information to identify a distance between the electronic apparatus 200 and the display apparatus 100. Also, the second controller 270 compares an attitude, for example, a degree of rotation or a tilting level, of the captured patterns 41, 42, 43 and 44 with the reference information to identify a direction of the electronic apparatus 200 to the display apparatus 100.

The distance and direction information may be corrected according to sensed results of the sensor 260. In an embodiment, the second controller 270 compares the identified distance and direction information with the sensed results of the sensor 260 to detect whether an error occurs in the sensor 260. Here, if a difference according to the comparison result is equal to or more than a preset standard level, the second controller 270 may notify the user via the second communicator 250, the second display 230 and the voice output to induce the user to check if the sensor is out of order.

If a movement of the electronic apparatus 200 is sensed, the second controller 270 identifies a location of the electronic apparatus 200 to display apparatus 100 in response to the movement.

In an embodiment, the second controller 270 may identify a relative location (distance and direction) of the electronic apparatus 200 to display apparatus 100 according to a combination of a result sensed through the camera 210 and a result sensed through the sensor 260.

In the electronic apparatus 200 according to an embodiment, the second controller 270 may control the second display 230 to generate and display a virtual object based on a location of the reality space using the location information (distance and direction).

The electronic apparatus 200 receives the screen, i.e., screen information of the first display 130 from the display apparatus 100 (305).

In an embodiment, information, such as a screen size, of the display apparatus 100 may be included in the patterns as illustrated in FIGS. 5 to 8, so that the information is obtained by an image captured with the camera 210 in the electronic apparatus 200. The second controller 270 of the electronic apparatus 200 may extract areas corresponding to corners or edges of the screen of the display apparatus 100 from the captured image, and identify screen size from the extracted areas. Here, the electronic apparatus 200 may further obtain additional information, such as a model name of the display apparatus 100, from the captured pattern.

In another embodiment, the electronic apparatus 200 may separately receive the information, such as the screen size, from display apparatus 100 through the second communicator 250. Here, the electronic apparatus 200 may further retrieve the additional information, such as the model name of the display apparatus 100, through the second communicator 250.

In other embodiment, the electronic apparatus 200 may identify the screen size of the display apparatus 100 using a marker installed on or attached to the display apparatus 100. The marker as, for example, an infrared reflective sheet, may be attached to four corner portions of the screen, to easily identify a screen area of the first display 130. In this case, the sensor 260 of the electronic apparatus 200 may include an infrared sensor.

The second controller 270 identifies a screen area, i.e., a TV screen area (50 in FIG. 9) of the display apparatus 100 in a field of view of the user wearing the electronic apparatus 200, i.e., the HMD device 201, based on the screen size information received and identified distance and direction information to the display apparatus 200 (306). Here, if the electronic apparatus 200 is a mobile device 202, the second controller 270 may identify a portion corresponding to a TV screen area (80 in FIG. 11) within an area of the second display 230.

The electronic apparatus 200 receives UI information from the display apparatus 100 (307). Here, the received UI information may include information of a UI displayed on the screen of the display apparatus 100, and also information of a virtual UI, which is not displayed on the display apparatus 100, but shown to the user through the electronic apparatus 200.

The UI information received from the display apparatus 100 includes location information. To be more specific, in case of the UI displayed on the screen of the display apparatus 100, information on a location of the UI in the screen and/or location information of a virtual UI, which is rendered at a location corresponding to the UI in the screen, is received. In case of the virtual UI which is shown to the user through the electronic apparatus 200, information on a specific location of an actual object, i.e., the display apparatus 100, which is a location on which the virtual UI is displayed, for example, relative location information, such as a top, a bottom, a left or a right of the TV screen, may be received. Any virtual UI may be always displayed on a fixed location in a user's field of view regardless of the location of the actual object, and for example, specified location information, such as a specific location in the user's field of view, for example, a right eye's bottom, may be also received.

The location information includes coordinate information, and the virtual UI may be displayed to correspond to the received coordinate information in the user's view area, which is provided by the second display 230. Here, the user's view area is defined as a display area identified by the field of view of the user wearing, for example, the HMD device 201, or a display area provided by the second display 203 of the mobile device 202.

In an embodiment, the UI information may be included in the patterns as illustrated in FIGS. 5 to 8, so that the information is obtained by the image captured with the camera 210 in the electronic apparatus 200.

In another embodiment, the electronic apparatus 200 may separately receive the UI information from the display apparatus 100 through the second communicator 250.

The UI information transmitted to electronic apparatus 200 from the display apparatus 100 may include not only the location information, but also operation information (TV data), such as an application, a channel, a content, etc., which is currently executed in the display apparatus 100. The operation information may be dynamically or periodically updated from the display apparatus 100.

The second controller 270 of the electronic apparatus 200 controls the second display 230 to, based on the received UI information, display the virtual UI on a location corresponding to the location information included in the received UI information (308). Here, the displayed virtual UI is related to a function or operation of the display apparatus 100.

The virtual UI is not displayed on the display apparatus 100, but provided, so that the user can see the virtual UI through the electronic apparatus 200. The virtual UI may include selection items corresponding to menus for controlling the display apparatus 100, contents capable of being reproduced in the display apparatus 100 and applications capable of being executed in the display apparatus 100. The menus for controlling the display apparatus 100 include power on/off, channel selection, volume adjustment, external input selection, user settings, etc. The items of the virtual UI may be displayed as a 2D virtual image, such as an icon or a thumbnail, or a 3D holographic object.

In an embodiment, the virtual UI may be a transparent UI, which is displayed on the TV screen area of the second display 230 to correspond to the UI displayed on the screen of the display apparatus 100. In this case, the user does not visually see a UI layer, and the transparent UI comes to a coordinate measurement UI for measuring a user input location by the electronic apparatus 200. In other words, the second controller 270 may recognize a user's motion at a location on which the virtual UI is rendered.

FIGS. 9 to 12 illustrate virtual UIs displaying through the electronic apparatus according to exemplary embodiments.

Figure 9:
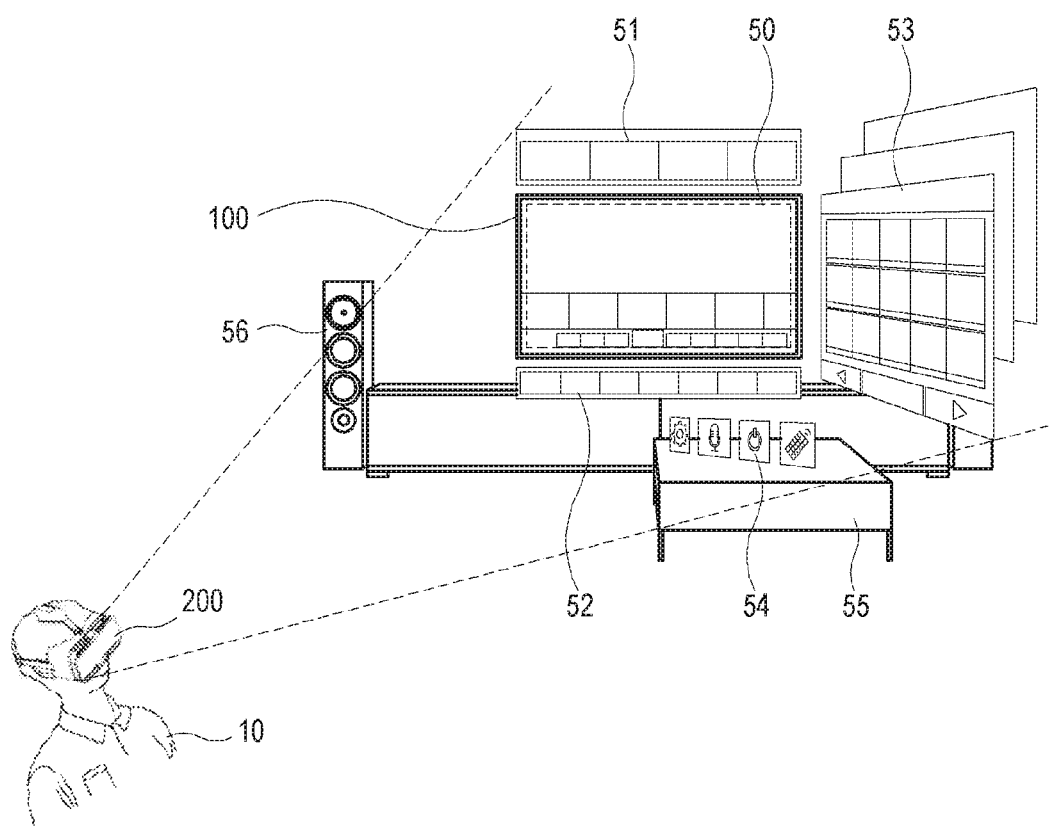
FIGS. 9, 10, 11, and 12 are diagrams illustrating virtual UIs displaying through the electronic apparatus according to embodiments.

As illustrated in FIG. 9, the second controller 270 of the electronic apparatus 200 displays virtual UIs 51, 52, and 54 on given locations based on the UI information received from the display apparatus 100.

In an embodiment, the virtual UIs 51, 52, 53 and 54 include selection items, which are selectable by the user at the display apparatus 100. The selection items may be displayed as icons corresponding to menus for controlling the display apparatus 100, contents capable of being reproduced in the display apparatus 100, applications capable of being executed in the display apparatus 100, etc.

As illustrated in FIG. 9, the selection items, i.e., the virtual UIs 51, 52 and 53 may be displayed on given locations out of the TV screen area 50 of the display apparatus 100. Here, the TV screen area 50 is invisible to user's sight, but may come to a standard location, i.e., a coordinate, at which the second controller 270 displays the virtual UI.

As an example, the second controller 270 may control the second display 230 to render the virtual UIs 51, 52 and 53 on at least one location of a top, a bottom, a left or a right of the TV screen area based on the UI information received from the display apparatus 100. For example, the second controller 270 identifies information of the previously identified TV screen area, and controls the second display 230 to display a selection item 51 as a virtual UI on a top of the TV screen. In the same manner, the selection items 52 and 53 may be displayed as virtual UIs on a bottom and a right side of the TV screen, respectively.

Referring to FIG. 9, a fixed menu for controlling the display apparatus 100 may be displayed as a virtual UI 54. The second controller 270 controls the second display 230 to display the virtual UI 54 on a preset location in a user's field of view or in the second display 230.

FIG. 9 illustrates displaying the virtual UI 54 on a fixed location, for example, a lower right side regardless of a movement of the user's field of view. In other words, in FIG. 9, the virtual UI 54 is illustrated as being located on a upper side of the table 55, but this is not based on the location of the table 55, and if the user moves her or his gaze, for example, to the left in FIG. 9, the virtual UI 54 may be displayed on a front side of a speaker 55.

As an example of the virtual UI 54 illustrated in FIG. 9, the menu may be implemented to include menus capable of controlling operations of the TV, for example, various menu items for channel change, volume adjustment, external input selection, user settings, etc.

Figure 10:
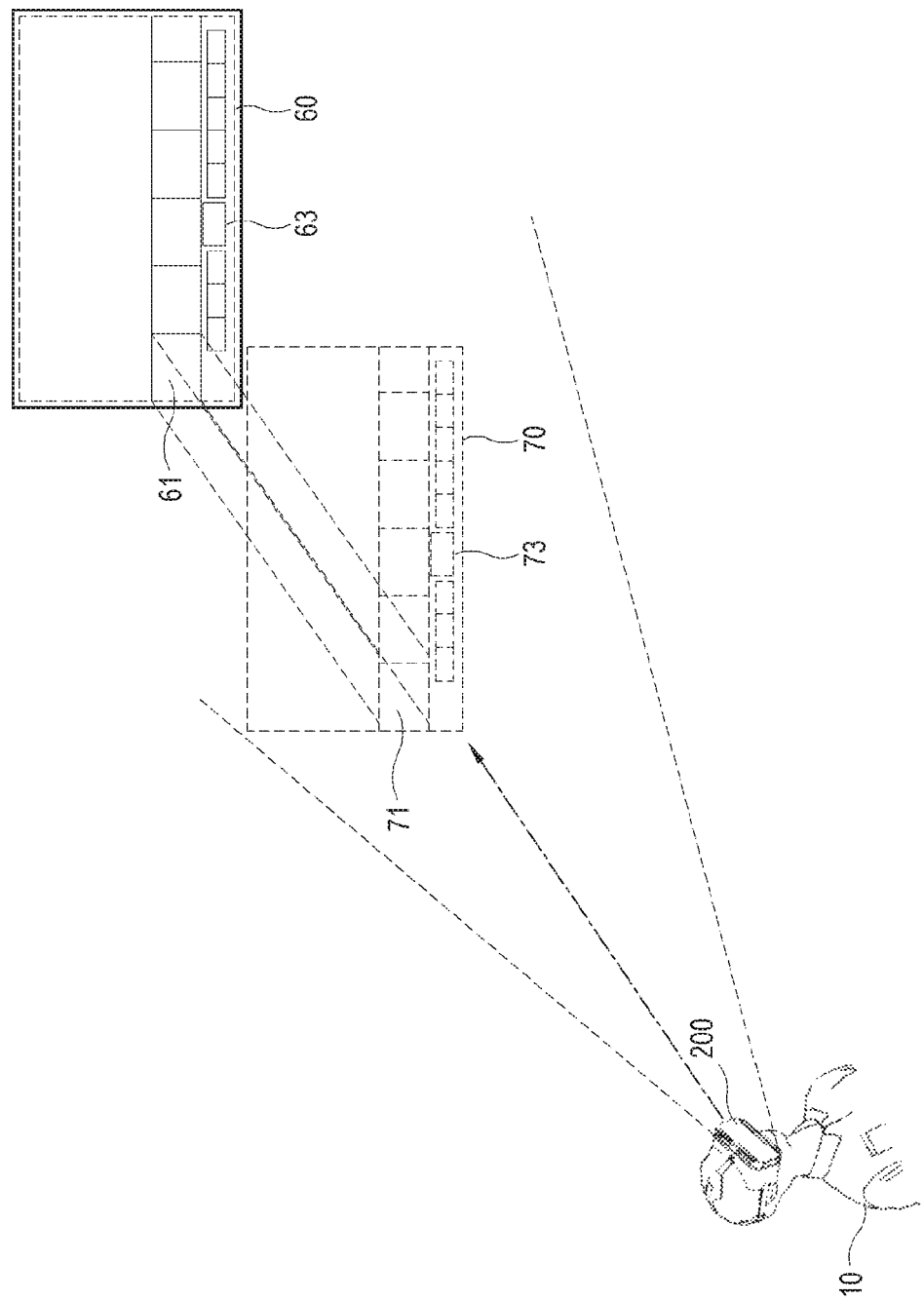

FIG. 10 illustrates the virtual UI 54 displayed on the screen area 50 of FIG. 9 in more detail. As illustrated in FIG. 10, the second controller 270 of the electronic apparatus 200 controls the second display 230 to render virtual UIs 71 and 73 on given locations in a TV screen area 70 based on the UI information received form the display apparatus 100.

The second controller 270 controls the second display 230, so that the virtual UIs 71 and 73 are located to correspond to menus 61 and 63 displayed on a screen 60 of the display apparatus 100 in the screen area 70.

In an embodiment, the virtual UIs 71 and 73 illustrated in FIG. 10 comes to transparent UIs corresponding to UIs 61 and 63, which are actually displayed on the first display 130 of the display apparatus 100. In other words, the virtual UIs 71 and 73 are located on a path of line of vision that the user views the actually displayed UIs 61 and 63, so the user may not visually recognize the virtual UIs 71 and 73.

Accordingly, when the user watches the display apparatus 100, i.e., a TV through the electronic apparatus 200, the virtual UIs 71 and 73 may be rendered on proper locations corresponding to the UIs 61 and 63 displayed on the screen of the display apparatus 100 in harmony therewith, thereby allowing the user to have a natural feeling which watches the TV screen 60 without a sense of difference.

In another embodiment, the virtual UIs 71 and 73 illustrated in FIG. 10 may be displayed as semitransparent UIs. In this case, the user may perceive the virtual UIs 71 and 73 by contrast or the like.

Figure 11:
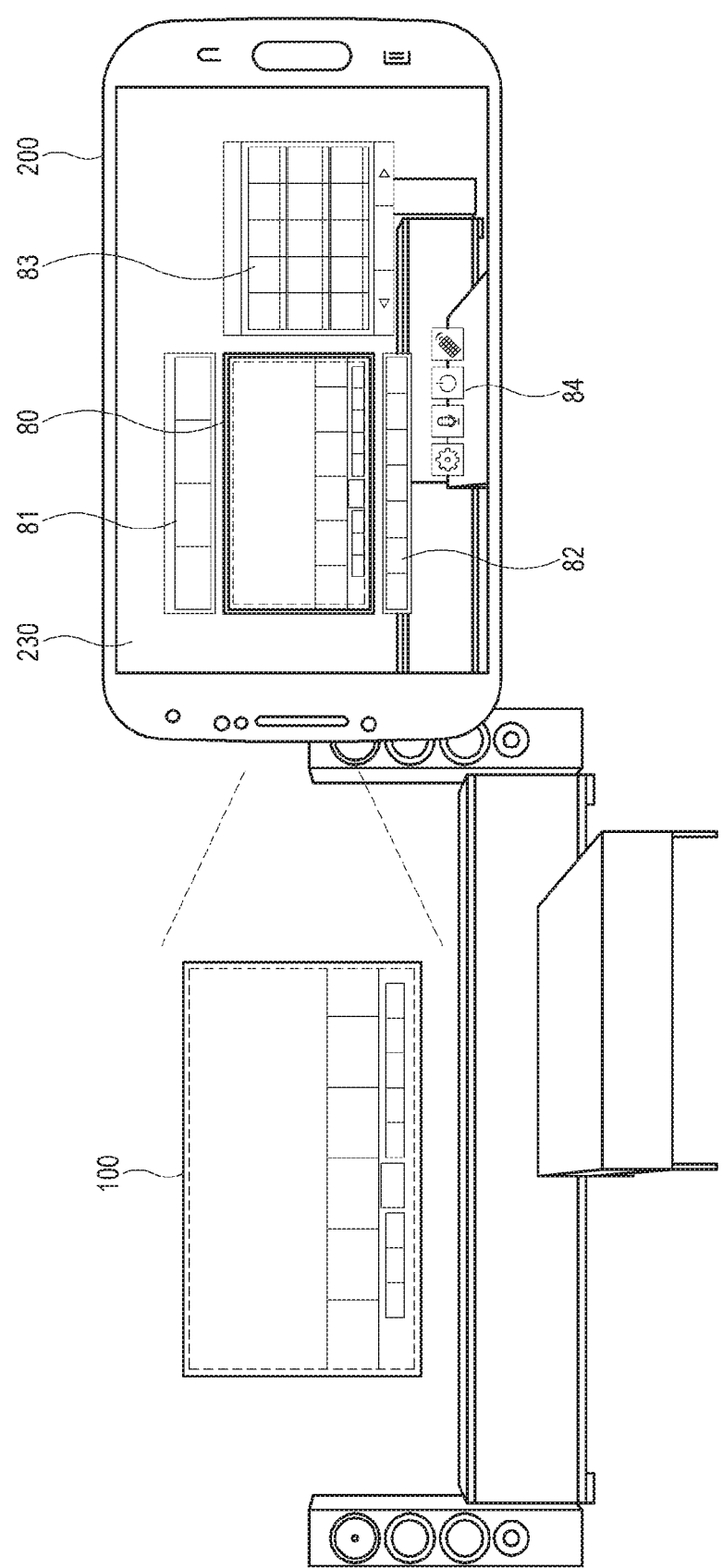
Figure 12:
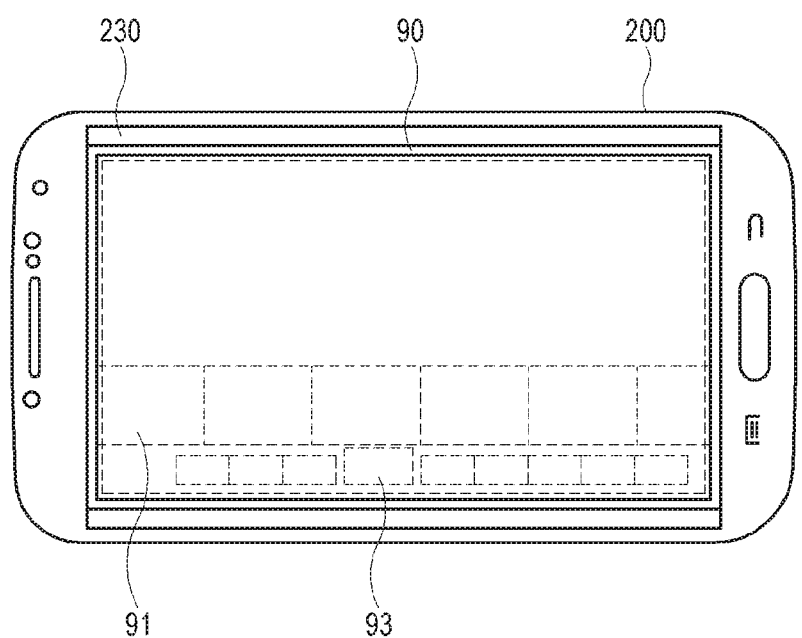

On the other hand, if the electronic apparatus 200 is a mobile device 202, virtual UIs, as illustrated in FIGS. 11 and 12, may be displayed.

As illustrated in FIG. 11, the second controller 270 of the electronic apparatus 200 displays virtual UIs 81, 82, and 84 on given locations based on the UI information received from the display apparatus 100.

The virtual UIs 81, 82, 83 and 84 illustrated in FIG. 11 are the same as the virtual UIs 51, 52, 53 and 54 of FIG. 9, except for being displayed on the second display 230 of the mobile device 202, so the explanations on the virtual UIs 51, 52, 53 and 54 of FIG. 9 may be also applied to the virtual UIs 81, 82, 83 and 84 of FIG. 11. However, the virtual UIs 53 and of FIG. 9 are illustrated as being implemented as 3D holographic objects, whereas the virtual UIs 83 and 84 of FIG. 11 may be implemented in a form of 2D virtual image.

FIG. 12 illustrates the virtual UIs displayed on a screen area 80 of FIG. 11 in a more little detail. As illustrated in FIG. 12, the second controller 270 of the electronic apparatus 200 controls the second display 230 to render virtual UIs 91 and 93 on given locations in a TV screen area 90 based on the UI information received form the display apparatus 100.

Like FIG. 11, the virtual UIs 91 and 93 illustrated in FIG. 12 are the same as the virtual UIs 71 and 73 of FIG. 10, except for being displayed on the second display 230 of the mobile device 202, so the explanations on the virtual UIs 71 and 73 of FIG. 10 may be also applied to the virtual UIs 91 and 93 of FIG. 12. However, the virtual UIs 71 and 73 of FIG. 10 are located on given location on a 3D space, whereas the virtual UIs 91 and 93 of FIG. 12 are located on a 2D coordinate of the second display 230 and thereby, in fact, correspond to locations of actual UIs displayed on the screen of the display apparatus 100.

Thus, the virtual UIs 91 and 93 illustrated in FIG. 12 come to transparent UIs located overlapping with fronts of the UIs actually displayed on the first display 130 of the display apparatus 100. Accordingly, the virtual UIs 91 and 93 are located on a path of line of vision that the user looks the UIs actually displayed on the TV screen, so the user may not visually recognize the virtual UIs 91 and 93 and have a feeling that she or he watches the actual UIs displayed on the TV screen.

In the embodiments illustrated in FIGS. 9 to 12, the second controller 270 controls the second display 230 to highlight currently selected virtual UI, thereby allowing the user to easily identify the selected UI. Here, the highlight may be variously applied, and includes emphasizing the selected UI with at least one of a contrast, a color, or a pointer, animating the selected UI, or the like.

The electronic apparatus 200 may receive a user's gesture input to the virtual UIs 51, 52, 53, 54, 71, 73, 81, 82, 83, 84, 91 and 93, as described with reference to FIGS. 9 to 12 (310).

In an embodiment, if the electronic apparatus 200 is a HMD device 201, the second controller 270 may sense a user's gesture, i.e., a motion input with the camera 210, and if a motion change into a specific motion is sensed at a location of one virtual UI from among the virtual UIs 51, 52, 53, 54, 71 and 73, identify that the one virtual UI is selected. Here, the specific motion for selecting the one virtual UI may be preset as, for example, making a trajectory of preset pattern, such as a circle, a triangle, a rectangular or the like with a hand or finger, performing an operation of making a first or unfolding palm one or more times, and so on.

In another embodiment, if the electronic apparatus 200 is a mobile device 202, the second controller 270 may sense a user's gesture, i.e., a touch input to a touch screen, and if a touch, such as a tap, a click or the like, is sensed at a location of one virtual UI from among the virtual UIs 81, 82, 83, 84, 91 and 93, identify that the one virtual UI is selected.

The electronic apparatus 200 transmits a signal, i.e., a message, which includes user input information to the virtual UIs, to the display apparatus 100 (311).

In an embodiment, the transmitted signal may include a control command, which enables the display apparatus 100 to perform an operation corresponding to the selected UI.

In another embodiment, the transmitted signal may include only location information, i.e., coordinate information, of the selected UI. In this case, based on the received coordinate information, the first controller 160 of the display apparatus 100 discerns a virtual UI displayed on the corresponding coordinate, and identifies that the virtual UI is selected by the user.

The display apparatus 100 performs an operation corresponding to the UI selection based on the received signal (320). For example, if a selection of a virtual UI 71 corresponding to a specific content is received in FIG. 10, the first controller 160 of the display apparatus 100 controls to reproduce the specific content to display an image corresponding thereto on the first display 130. Also, if a virtual UI 73 corresponding to a specific application is selected in FIG. 10, the first controller 160 of the display apparatus 100 controls to execute the specific application thus to display an image corresponding thereto on the first display 130.

As another example, if a selection to a power icon among menu items 54 and 84 is received in FIG. 9 or 11, the display apparatus 100 is powered off.

Operations explained with reference to FIG. 4 as describe above, which are an example of interaction operations between the display apparatus 100 and the electronic apparatus 200, are not limited to the order illustrated in FIG. 4, and more than two operations may be simultaneously performed or any one operation may be performed at preset time intervals.

Hereinafter, a control method of the electronic apparatus according to an embodiment will be described with reference the drawing.

Figure 13:
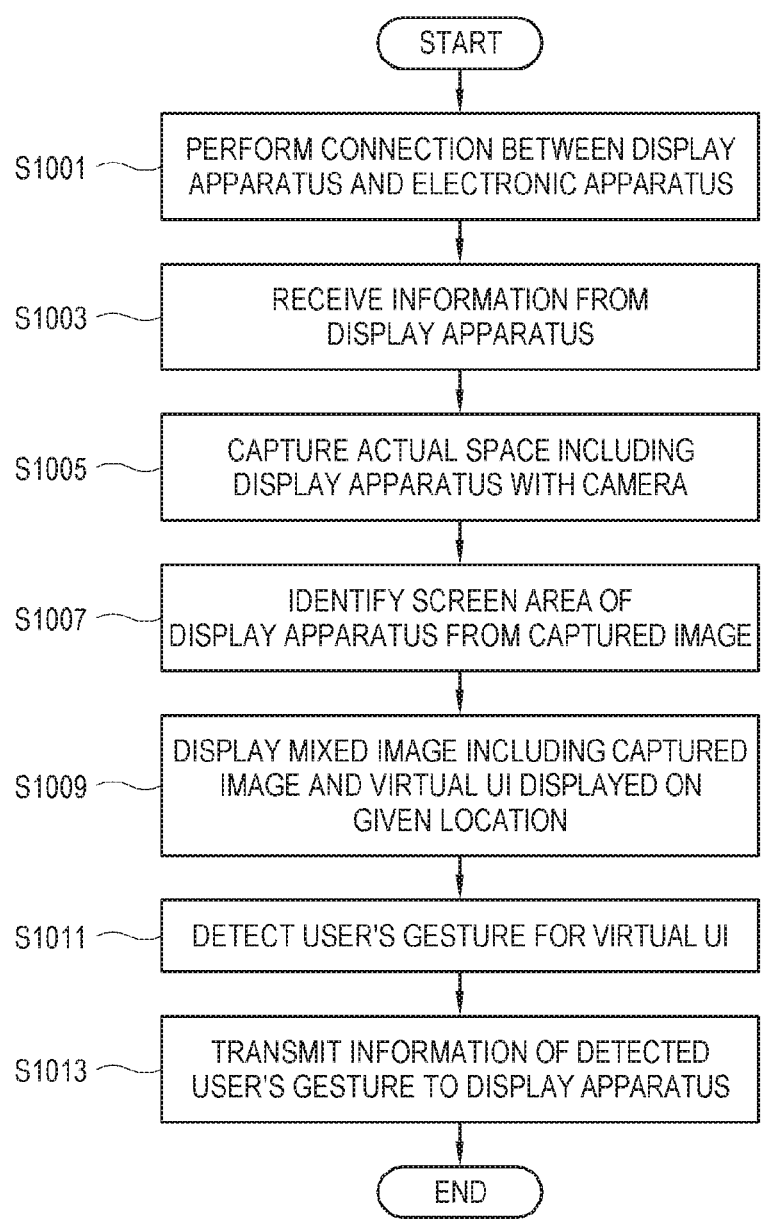
FIG. 13 is a flowchart illustrating a method of controlling an electronic apparatus according to an embodiment.

FIG. 13 is a flowchart illustrating a method of controlling the electronic apparatus according to an embodiment.

As illustrated in FIG. 13, the electronic apparatus 200 according to an embodiment performs a connection with the display apparatus 100 (S1001). Here, the electronic apparatus 200 may obtain identification information for communication setting of the display apparatus 100 via an image, which is obtained by capturing a pattern displayed on the display apparatus 100 with the camera 210.

The electronic apparatus 200 receives information from the display apparatus 100 (S1003). Here, the received information includes information for identifying relative location (distance and direction) and size (size of screen area) of the electronic apparatus 200 to the display apparatus 100, and UI information for displaying virtual UIs on given locations. At the operation S1003, the information may be obtained via the image captured at the operation S1001, or received from the display apparatus 100 via the second communicator 250 according to the connection between the two apparatuses at the operation S1001. The UI information may be received updating information changed according to operations of the display apparatus 100, and further include content information of corresponding UIs, besides coordinate information.

On the other hand, the electronic apparatus 100 captures an actual space including the display apparatus 100 with the camera 210 (S1005). Here, if the captured image is used at the operation S1001 or S1003, the operation S1005 may be included and performed in the operation S1001 or S1003.

The second controller 270 of the electronic apparatus 200 identifies a screen area of the display apparatus 100 from the image captured at the operation S1005 (S1007). Here, the second controller 270 may identify the relative location (distance and direction) of the electronic apparatus 200 to the display apparatus 100 using the received information, and identify the screen area according to the identified relative location.

And, the second controller 270 generates a mixed image, which includes the captured image and the virtual UIs displayed on the given locations, to display through the second display 230 (S1009). Here, the virtual UIs may be displayed on at least one of a top, a bottom, a left or a right of the screen area identified at the operation S1007 as given locations of the display apparatus 100, which is a reality object, or fixedly displayed on given locations in a user's view area provided through the second display 230 regardless of the actual object. Also, the virtual UIs may be displayed in the screen area identified at the operation S1007. In this case, the virtual UIs may come to transparent UIs corresponding to actual UIs, which are currently displayed on the screen of the display apparatus 100.

And then, the second controller 270 may detect a user's gesture to the virtual UIs displayed at the operation S1009 (S1011). Here, the second controller 270 may detect a user's gesture by a motion or touch input, which selects the virtual UIs.

The second controller 270 transmits information of the user's gesture, i.e., user input information, detected at the operation S1011 to the display apparatus 100 through the second communicator 250 (S1013). Here, the transmitted user input information may include the coordinate information of the virtual UI selected at the operation S1011, or a control command corresponding to the selected virtual UI. The display apparatus 100 receives the transmitted user input information and performs an operation corresponding to the selected virtual UI.

According to the embodiments as described above, the electronic apparatus, the control method thereof and the computer program product using the same may display various UIs to the user through the electronic apparatus 200, which provides the MR, and enable user's inputs to the display apparatus 100 using the displayed UIs, thereby allowing the electronic apparatus 200 to function as a single remote input device which actually replaces a remote controller.

Further, the electronic apparatus, the control method thereof and the computer program product using the same may enable interactions between the display apparatus 100 and the electronic apparatus 200 via simple gestures, i.e., motion inputs or touch inputs, which are received from the user with respect to the virtual UI, and display the virtual UI based on location of the captured TV screen area, thereby controlling operations of the display apparatus 100 in response to user's exact input locations.

Also, the electronic apparatus, the control method thereof and the computer program product using the same may render the virtual UI in the screen area to correspond to the actual menu displayed on the display apparatus 100, thereby allowing the user to naturally use the electronic apparatus 200 without a sense of difference like selecting the UI of the TV screen.

Although the disclosure has been described with various embodiments, various changes and modifications may be suggested to one skilled in the art. It is intended that the disclosure encompass such changes and modifications as fall within the scope of the appended claims.

What is claimed is:

1. An electronic apparatus for controlling a display apparatus to execute a function of the display apparatus, the electronic apparatus comprising:
   a camera configured to capture an image;
   a communicator configured to communicate with the display apparatus;
   a display;
   a processor configured to:
      receive information indicating a first location on which a first virtual user interface (UI) of a first type is to be displayed and a second location on which a second virtual user interface (UI) of a second type is to be displayed, through the communicator from the display apparatus;
identify a screen area of the display apparatus from the captured image;
identify a first display area on which the first virtual UI is to be displayed and a second display area on which the second virtual UI is to be displayed, respectively, based on the received information;
control the display to display the first virtual UI and the second virtual UI together on the identified first display area and the identified second display area, respectively;
identify that a user input selecting an element of at least one the first virtual UI or the second virtual UI is received; and
control the communicator to transmit a control command corresponding to the received user input to the display apparatus so that the display apparatus performs an operation corresponding to the selected element based on the control command.

2. The electronic apparatus according to claim 1, wherein at least one of the first display area or the second display area is on the screen area.

3. The electronic apparatus according to claim 2, wherein at least one of the first location or the second location is relative to the screen area corresponding to at least one of a top, a bottom, a left, or a right of the screen area.

4. The electronic apparatus according to claim 2, wherein at least one of the first location or the second location corresponds to a menu displayed on a screen of the display apparatus in the screen area.

5. The electronic apparatus according to claim 2, wherein at least one of the first location or the second location corresponds to a preset location in a user's view area provided by the display.

6. The electronic apparatus according to claim 2, wherein the processor is configured to:
identify a location of the electronic apparatus relative to the display apparatus based on pattern information from the image; and
identify the screen area based on the location of the electronic apparatus relative to the display apparatus.

7. The electronic apparatus according to claim 1, wherein the processor is configured to:
receive coordinate information of the first virtual UI and the second virtual UI from the display apparatus through the communicator; and
display the first virtual UI and the second virtual UI to correspond to the coordinate information in a user's view area provided by the display.

8. The electronic apparatus according to claim 1, wherein the processor is configured to control the communicator to, in response to a user's gesture selecting the element of at least one of the first virtual UI or the second virtual UI, transmit the control command corresponding to the element to the display apparatus.

9. The electronic apparatus according to claim 1, wherein each of the first virtual UI and the second virtual UI corresponds to at least one of a menu for controlling the display apparatus, a content capable of being reproduced in the display apparatus, or an application capable of being executed in the display apparatus.

10. The electronic apparatus according to claim 1, the processor is configured to perform a connection with the display apparatus through the communicator based on information from the image.

11. A method of controlling a display apparatus to execute a function of the display apparatus using an electronic apparatus, the method comprising:
capturing an image with a camera;
receiving information indicating a first location on which a first virtual user interface (UI) of a first type is to be displayed and a second location on which a second virtual user interface (UI) of a second type is to be displayed from the display apparatus;
identifying a screen area of the display apparatus from the captured image;
identifying a first display area on which the first virtual UI is to be displayed and a second display area on which the second virtual UI is to be displayed, respectively, based on the received information;
displaying the first virtual UI and the second virtual UI together on the first identified display area and the identified second display area, respectively;
identifying that a user input selecting an element of at least one of the first virtual UI or the second virtual UI is received; and
transmitting a control command corresponding to the received user input to the display apparatus so that the display apparatus performs an operation corresponding to the selected element based on the control command.

12. The method according to claim 11, wherein at least one of the first display area or the second display area is on the screen area.

13. The method according to claim 12, wherein at least one of the first location or the second location is relative to the screen area corresponding to at least one of a top, a bottom, up, a left, or a right of the screen area.

14. The method according to claim 12, wherein at least one of the first location or the second location corresponds to a menu displayed on a screen of the display apparatus in the screen area.

15. The method according to claim 12, wherein at least one of the first location or the second location corresponds to a user's view area provided by a display of the electronic apparatus.

16. The method according to claim 12, wherein the identifying the screen area comprises:
identifying a location of the electronic apparatus relative to the display apparatus based on pattern information; and
identify the screen area based on the location of the electronic apparatus relative to the display apparatus.

17. The method according to claim 11, wherein the receiving the information comprises receiving coordinate information of the first virtual UI and the second virtual UI from the display apparatus, and
wherein the displaying the first virtual UI and the second virtual UI comprises displaying the first virtual UI and the second virtual UI to correspond to the coordinate information in a user's view area provided by a display of the electronic apparatus.

18. The method according to claim 11, further comprising:
receiving a user's gesture selecting the element of at least one of the first virtual UI or the second virtual UI; and
in response to the user's gesture, transmitting the control command corresponding to the element to the display apparatus.

19. The method according to claim 11, further comprising performing a connection with the display apparatus through a communicator based on information from the image captured by the camera.

20. A non-transitory computer readable medium having stored thereon computer executable instructions for executing a method of controlling a display apparatus to execute a function of the display apparatus using an electronic apparatus, the method comprising:
- capturing an image with a camera;
- receiving information indicating a first location on which a virtual user interface (UI) of a first type is to be displayed and a second location on which a second virtual user interface (UI) of a second type is to be displayed from the display apparatus;
- identifying a screen area of the display apparatus from the captured image;
- identifying a first display area on which the first virtual UI is to be displayed and a second display area on which the second virtual UI is to be displayed, respectively, based on the received information;
- displaying the first virtual UI and the second virtual UI together on the identified first display area and the second display area, respectively;
- identifying that a user input selecting an element of at least one of the first virtual UI or the second virtual UI is received; and
- transmitting a control command corresponding to the received user input to the display apparatus so that the display apparatus performs an operation corresponding to the selected element based on the control command.

* * * * *